United States Patent [19]

Meyer et al.

[11] Patent Number: 4,892,927

[45] Date of Patent: Jan. 9, 1990

[54] α-AMINO-ε-CAPROLACTAM-MODIFIED POLYAMIDE OF DICARBOXYLIC ACIDS/DIAMINES

[75] Inventors: Rolf-Volker Meyer; Rolf Dhein; Michael Dietrich; Heinz Bonten; Hans-Detlef Heinz, all of Krefeld; Peter-Rolf Müller, Leverkusen, all of Fed. Rep. of Germany

[73] Assignee: Bayer Aktiengesellschaft, Leverkusen, Fed. Rep. of Germany

[21] Appl. No.: 182,335

[22] Filed: Apr. 18, 1988

[30] Foreign Application Priority Data

May 1, 1987 [DE] Fed. Rep. of Germany ....... 3714609
Mar. 2, 1988 [DE] Fed. Rep. of Germany ....... 3806632

[51] Int. Cl.$^4$ .............................................. C08G 69/14
[52] U.S. Cl. .................................... 528/324; 528/312; 528/323; 528/328; 528/329.1; 528/336; 528/480; 528/481; 528/503

[58] Field of Search ............ 528/328, 324, 323, 329.1, 528/312, 336, 480, 481, 503

[56] References Cited

U.S. PATENT DOCUMENTS 2,578,428 12/1951 Kaczalski ............................. 528/328
4,297,477 10/1981 Nakata et al. ........................ 528/312

FOREIGN PATENT DOCUMENTS 543426 2/1942 United Kingdom .

Primary Examiner—Harold D. Anderson
Attorney, Agent, or Firm—Connolly and Hutz

[57] ABSTRACT

This invention relates to thermoplastically deformable, high molecular weight, slightly branched aliphatic polyamides prepared by the polycondensation of polyamide-forming, aliphatic diamine/dicarboxylic acid mixtures, optionally with the addition of lactams and special amino acids, in the presence of small quantities of α-amino-ε-caprolactam, and optionally their thermal solid phase after-condensation.

11 Claims, No Drawings

α-AMINO-ε-CAPROLACTAM-MODIFIED POLYAMIDE OF DICARBOXYLIC ACIDS/DIAMINES

This invention relates to thermoplastically deformable, high molecular weight, slightly branched aliphatic polyamides prepared by the polycondensation of polyamide-forming, aliphatic diamine/dicarboxylic acid mixtures, optionally together with lactams or special amino acids, in the presence of small quantities of α-amino-ε-caprolactam, and optionally their thermal solid phase after-condensation.

Polyamides constitute a class of polymers which have been widely used for many years for numerous practical applications and may be prepared by various methods from a variety of widely differing polyamide-forming starting materials; and for special applications they may be used, either alone or in combination with processing auxiliaries, polymeric alloying components or reinforcing materials (such as mineral fillers or glass fibres), for the production of materials with special combinations of properties. Thus polyamides are used in large quantities for the manufacture of fibres, plastic moulded parts and films but also as hot melt adhesives and as auxiliary agents for numerous technical applications.

Whereas lactams may be converted into polyamides by cationic, hydrolytic (with the addition of water) or anionic reactions, the preparation of polyamides from polyamide forming monomers such as diamines, dicarboxylic acids or suitable derivatives and amino carboxylic acids, even in combination with lactams, is virtually confined to the polycondensation reaction (see Vieweg, Müller; Kunststoff Handbuch, volume VI, page 11 et sec, Carl-Hanser-Verlag, Munich 1966).

Numerous methods have become known for the preparation of polyamides, and a variety of monomer starting materials for determining the nature of the matrix, various chain terminating agents for adjusting the desired average molecular weight and monomers containing "reactive" groups for envisaged after-treatments (e.g. amino groups or sulphonate groups for improving dye absorption of fibres with acid or basic dyes) are used, depending on the nature of the desired end product.

Both continuous and discontinuous methods of production are known, e.g. in autoclaves.

Common to all these methods for the preparation of (co)polyamides by polycondensation or by hydrolytic polymerisation of the polyamide-forming diamine/dicarboxylic acid reaction mixtures and/or amino acids optionally used in combination with lactams is, however, that, starting from suitable monomer mixtures, preparation of the (co)polyamides requires a polycondensation time of at least 6 to 12 hours before the polyamides have reached sufficiently high molecular weights to enable strands to be spun from the polymer melt or the required molecular weights for the envisaged practical application of the product. Owing to the low reaction velocity, this inevitably entails relatively long after-condensation times at relatively high temperatures which frequently damage the polymer (discolouration, oxidation).

Inspite of the long reaction time, it is in many cases also necessary to carry out an after-condensation, e.g. in the solid phase, for obtaining even higher molecular weights. Owing to the low reaction velocity, this inevitably entails relatively long after-condensation times and relatively high temperatures, which often have a damaging effect (colour, oxidation).

The long reaction times required for the preparation of the (co)polyamides thus seriously limit the capacity of the production plants and in particular are highly energy consuming and cost intensive since the reactions must be carried out at temperatures above 200° C., in most cases above 250° C. but always above the melting point of the product to be produced.

It would therefore be regarded a considerable advantage, in particular for the saving of cost and energy, to achieve a substantial reduction in the reaction times for the preparation of (co)polyamides without forfeiting the well known advantageous use properties of the products for their practical application.

It has now surprisingly been found that the polycondensation time and/or polycondensation temperature for the preparation of co(polyamides) from polyamide-forming diamine/dicarboxylic acid mixtures and/or amino acids, optionally in combination with lactams, can be drastically reduced by adding small quantities of α-amino-ε-caprolactam (ACL) to the polyamide forming starting monomers, a method which nevertheless results in polyamides with high molecular weights (solution viscosities $\eta R \geq 2.8$, preferably $\geq 3.0$).

For many applications which require products with even higher molecular weights, e.g. the extrusion to films or semi-finished products, it is necessary to obtain a further increase in the molecular weight in addition to the basic process for the preparation of the polyamides. This additional increase in molecular weight is difficult to achieve in conventional polycondensation apparatus such as autoclaves in the case of discontinuous methods of production or VK tubes or tube reactors in the case of continuous methods of production because the sharp increase in melt viscosity gives rise to various problems. Thus the temperature control and removal of the water of reaction become progressively more difficult and the long reaction time at the high temperatures required leads to an increased amount of side reactions and the formation of gel particles which are liable to cause a drastic deterioration in the quality of the end product. Spinning also becomes increasingly more difficult at very high melt viscosities.

It is for these problems that solid phase after-condensation affords decided advantages. Owing to the much lower reaction temperatures (about 180° to 220° C., depending on the polyamide, compared to 250° to 280° C. for melt condensation), the risk of undesirable side reactions and gelling is reduced. The fact that the material which is to undergo after-condensation consists of definite particles with interspace volumes, combined with a variation of the process in which the granulate is kept in continuous motion, e.g. in tumbler dryers, enables a uniform reaction temperature to be maintained more easily and facilitates removal of the water of reaction. Since the material consists of particles, the problems involved in spinning do not arise.

Although the solid phase after-condensation process is widely used on an industrial scale for the production of relatively high molecular weight polyamides, it still has numerous disadvantages due to the relatively low after-condensation speed. The usual after-condensation process still requires a high consumption of time and energy and owing to the considerable residence time at the given reaction temperature the process also entails a high cost of apparatus.

It would therefore be regarded as a great technological advance, and especially one which is cost saving, if the solid phase after-condensation of polyamides could be considerably speeded up and/or carried out at lower temperatures without any loss in the advantageous properties of the polyamides.

It has now surprisingly been found that the polyamides according to the invention which contain α-amino-ε-caprolactam (ACL) can be after-condensed unusually rapidly in the solid phase to give rise to very high molecular weight products even with a reduction in the reaction temperature.

In spite of the fact that the fusion polycondensation as such is accelerated by ACL, this effect is unexpected and was not foreseeable since it is well known that fusion polycondensation and solid phase after-condensation obey quite different laws and are based on quite different mechanisms (see e.g. R. J. Gaymans, J. Amirtharaj, H. Kamp, J. Appl. Polym. Sci. 27, 2513–2526 (1984); L. B. Sokolov; Solid Phase Polymerisation, Syntheses by Polycondensation Publ. Israel Programme for Scientific Translation, 1968).

The invention therefore also relates to polyamides which have a high molecular weight and branched structure but are still soluble, and to a process for their preparation, characterised in that they are prepared by solid phase after-condensation of the ACL-modified polyamides.

It was also found that high molecular weight and presumably branched polyamides can be obtained with a substantially higher melt viscosity than that of (co)-polyamides which are free from ACL if a solid phase after-condensation is carried out for a much shorter time and at a lower reaction temperature than those employed for polyamides which are free from ACL.

The present invention therefore relates to a process for the preparation of (co)polyamides from polyamide-forming, predominantly aliphatic diamines and dicarboxylic acids or their salts and/or amino acids, optionally in combination with ω-lactams, characterised in that from 0.02 to 1% by weight, preferably from 0.05 to 0.6% by weight, most preferably from 0.1 to 0.3% by weight of α-amino-ε-caprolactam (hereinafter also referred to as ACL) are added to the polyamide-forming mixture which is to be polymerised and in that these ACL-modified (co)polyamides are optionally after-condensed in the solid phase to form (co)polyamides with increased viscosity and melt viscosity which have a branched structure but are still soluble in m-cresol.

The present invention further relates to the ACL-modified (co)polyamides obtained by this process and high molecular weight (co)polyamides with increased melt viscosity which are branched but still soluble in m-cresol obtained by after-condensation in the solid phase, and to the moulded products produced from them.

Many experiments have been described for obtaining basic polyamides which are more readily dyed with acid dyes, in particular when used as fibres, by co-condensation with polyamide-forming starting materials containing basic groups.

DE-A No. 1 770 754, for example, discloses that improved dye absorption of polyamide fibres and higher colour intensity can be obtained with numerous additives of this kind.

ACL is also mentioned there as one of several examples of additives to be used, but the polyamide-6 described in the relevant example (VIII), i.e. a polyamide of ε-caprolactam, does not differ significantly from the others.

There is complete absence of any indication in the said disclosure that ACL has the property of reducing the reaction time.

In EP-A No. 0 013 553 it is described that a polymer of ACL was hitherto unknown and it is assumed there that crosslinking would inevitably take place owing to the possibilities of reaction of the amino group during polycondensation.

EP-A No. 0 013 553 describes polyamides of N,N-dialkyl-substituted α-amino-ε-caprolactam which are distinguished by their special solubility properties and dye absorption properties. These N,N-dialkyl-substituted amino caprolactam derivatives used as tertiary amine derivatives also fail to manifest any capacity to reduce the reaction time required for polycondensation of the polyamide-forming diamine/dicarboxylic acid mixtures and/or amino acids, optionally used in combination with lactams. The lactams are used in quantities of up to 90% by weight, preferably up to 60% by weight and most preferably less than 50% by weight of the polyamide forming components.

It was therefore completely unforeseeable and unexpected that the measure of adding ACL to the monomeric reaction mixture at the beginning of the reaction would result in drastic acceleration of polyamide formation.

Dicarboxylic acids containing 6 to 36 carbon atoms, preferably 6 to 12 carbon atoms, are suitably used as polyamide forming aliphatic dicarboxylic acids. The following are examples: adipic acid, pimelic acid, trimethyl adipic acid, octane diacid, azelaic acid, sebacic acid, dodecane diacid, heptadecane dicarboxylic acids (mixture of 1,8- and 1,9-), and dimeric fatty acids (hydrogenated or unhydorgenated $C_{36}$). Adipic acid, azelaic acid, dodecane diacid and dimeric fatty acids are preferred. A proportion of aromatic dicarboxylic acids such as isophthalic acid or terephthalic acid may also be included.

Examples of aliphatic diamines include those containing 4 to 12 carbon atoms, e.g. 1,4-diaminobutane, hexamethylene diamine, octamethylene diamine, trimethyl-hexamethylene diamine, decamethylene diamine and isophorone diamine. Hexamethylene diamine and trimethylhexamethylene diamines are preferred.

In addition to the dicarboxylic acids and diamines mentioned above, dicarboxylic acids and diamines in which the alkylene chains contain oxygen atoms are also suitable, e.g. 1,8-diamino-3,6-dioxaoctane, 1,11-diamino-3,6,9-trioxaundecane and 3,6-dioxa-heptanoic acid.

Examples of suitable amino acids are those which have at least 5 carbon atoms between the aminofunction and the carboxyl function, 6-aminohexanoic acid, 11-aminoundecanoic acid and 12-aminododecanoic acid being preferred.

The diamine-dicarboxylic acid mixtures may selectively be put into the process as separate components or, preferably, they may be introduced, as is well known, in the form of previously prepared dicarboxylic acid/diamine salts (e.g. AH salt of adipic acid and hexamethylene diamine) to ensure the stoichiometrically correct proportions.

Conventional chain terminating agents, e.g. monofunctional carboxylic acids or amines, e.g. acetic acid, hexanoic acid, benzoic acid, cyclohexane dicarboxylic acid, stearic acid, hexylamine or cyciohexylamine may be used in the usual quantities.

The lactams used for the purpose of this invention may be lactsm containing 5 to 13 ring members, such as pyrrolidone, ε-caprolactam, oenantholactam, caprylic lactam or lauric lactam, used either separately or as mixtures, ε-caprolactam and lauric lactam being preferred. ε-Caprolactam is particularly preferred.

Mixtures of the diamines, dicarboxylic acids, aminocaboxylic acids or lactams may be used.

α-Amino-ε-caprolactam (ACL) is a known compound and may be prepared by known processes (CAS No. 671/42/1).

From 0.02 to 1% by weight, preferably from 0.05 to 0.6% by weight, most preferably from 0.1 to 0.3% by weight of ACL is to be used according to the invention for accelerating the polycondensation of polyamide forming diamine/dicarboxylic acid mixtures and/or amino acids, optionally in combination with lactams. The ACL should in all cases preferably be added before or at the beginning of the reaction. At a reaction temperature of 270° C., for example, the polycondensation time may then be reduced from about 6–10 hours to 0.2–3 hours, preferably to 1–3 hours, and the amount by which the reaction time can be reduced with a given concentration of ACL increases as the proportion of lactam, which is optionally present, decreases. In the process according to the invention, the polycondensation time at the chosen polycondenation temperature is less than half the polycondensation time required for conventional processes.

It may be considerably shortened, preferably to 0.1–3 hours, more preferably to 0.2–3 hours at temperatures above 200° C., preferably above 220° C. and especially at 220° to 285° C. The shorter polycondensation times are preferably employed at the higher temperatures.

The reaction accelerating effect may in many cases also be used to carry out PA synthesis at a lower melt temperature. This may have an advantageous effect on the properties of the product and the monomer/dimer contents of the polyamides in the case of lactam copolymers due to the less severe temperature conditions. (PA=polyamide).

Compared with known products having a comparable solution viscosity ($\eta_{rel}$, 1% in m-cresol at 25° C.), the polyamides obtained have characteristically different melt viscosities and have a pronounced structural viscosity. This could indicate a slightly branched structure. On the basis of their technological properties, however, the polyamides may be used in much the same way as conventional technical polyamides but can be produced with less consumption of energy.

The polyamides produced according to the invention may be discharged from the melt in a known manner, preferably into a water bath, and chopped up, extracted and dried.

Moulded articles, fibres and films with improved properties may also be obtained from the polyamides by thermoplastic processing in a known manner.

The ACL-modified (co)polyamides obtained as described above may be after-condensed in the solid phase at temperatures below their melting point for the purpose of increasing the molecular weight at relatively low reaction temperatures. The melt viscosity is generally also considerably increased at the same time.

Any ACL-modified (co)polyamides prepared by melt polycondensation may be used for the preparation of these high molecular weight, branched polyamides by solid phase after-condensation. Those based on polyamide 66, 610 and 6/66 (co)polyamides, for example, are particularly suitable.

The reaction time in the solid phase required for reaching a desired melt viscosity is drastically reduced compared with that required for polyamides which are not ACL-modified and the after-condensation may be carried out at substantially lower temperatures.

Suitable reaction temperatures for the after-condensation lie in the range of from 140° to 240° C., preferably from 150° to 230° C., more preferably 150° to 200° C. The reaction should in all cases be carried out at a temperature at least 10 deg. cent., preferably at least 20 deg. cent. below the melting point of the particular polyamide.

The condensation time may vary from a few minutes to about 30 hours, and is preferably chosen in the range of 0.5 to 20 hours, in particular 1 to 15 hours. The longer reaction times should be employed particularly at the lower after-condensation temperatures and the shorter reaction times preferably at the higher after-condensation temperatures.

All apparatus conventionally used for a solid phase after-condensation are suitable for the preparation of the polyamides according to the invention. For discontinuous processes, tumbler dryers and helical mixers are preferably used. Continuous solid after-condensation processes are also suitable for the preparation of the polyamides according to the invention.

The high molecular weight, branched polyamides have characteristically higher melt viscosity values than comparable known products of a similar solution viscosity ($\eta_{rel}$, 1% in m-cresol at 25° C.) and show a marked structural viscosity.

The high molecular weight, branched polyamides are suitable for all the applications of high molecular weight polyamides but especially for extrusion to form films or semi-finished products or for the manufacture of fibres and bristles or as bases for the preparation of polyamide mixtures with known impact strength modifiers to give rise to products with exceptionally high impact strength and resistance to low temperatures.

The following examples serve to illustrate the invention without in any way limiting it.

The melt viscosity values were measured with a Contraves RM 300 Plate-Cone Viscosimeter at the given temperatures.

EXAMPLE 1

80 g of AH salt (equimolar salt of hexamethylene diamine and adipic acid) and 0.70 g of a 50% aqueous solution of α-amino-ε-caprolactam (ACL) corresponding to 0.5% by weight of ACL, based on polyamide-66, were introduced into a 250 ml round bottomed flask. After the flask had been evacuated twice and pressure released with nitrogen, the contents were heated to 200° C. in about 15 minutes with stirring under a nitrogen atmosphere and precondensed for 1 hour at 200° C. The reaction mixture was then heated to about 270° C. in about 15 minutes with stirring and the reaction wa stopped 10 minutes after the temperature of 270° C. was reached. A polyamide having a relative viscosity ($\eta_{rel}$, 1% in m-cresol at 25° C.) of 3.0 was obtained.

EXAMPLE 2

A polyamide-66 was prepared by a method analogous to that of Example 1 but with the addition of 0.20 g of adipic acid together with the quantity of ACL indicated above. The product was very similar to that obtained in Example 1 and had a relative viscosity of 2.9.

COMPARISON EXPERIMENT 1

When the reaction was carried out in a manner similar to that described in Example 1 but without the addition of ACL, the polyamide obtained had a very low melt viscosity (and a relative viscosity of only 1.8).

EXAMPLE 3

Example 1 was repeated but with the additin of only 0.40 g of the ACL solution (corresponding to 0.3% by weight of ACL, based on AH salt) and condensation was carried out for 30 minutes at 270° C. In spite of the very short polycondensation time, the product obtained had a high melt viscosity and a relative viscosity of 2.8.

EXAMPLE 4

A copolyamide was prepared according to Example 1 from 60 parts by weight of ε-caprolactam, 46.4 parts by weight of AH salt and 1.2 g of a 50% aqueous solution of ACL (0.6% by weight). A 6/66 copolyamide having a very high melt viscosity was obtained after a polycondensation time of 30 minutes at 270° C. After extraction of the caprolactam content with water (8% extract), the relative solution viscosity was 4.5.

EXAMPLE 5

A copolyamide was prepared according to Examples 1 and 4 from 20 parts by weight of ε-caprolactam and 93 parts by weight of AH salt with the addition of 1.2 g of the 50% aqueous solution of ACL (corresponding to 0.6% by weight of ACL). A 6/66 polyamide with a very high melt viscosity was obtained after only 30 minutes at 270° C. The relative viscosity of the polyamide which had not been extracted was 4.0.

EXAMPLE 6

8.10 kg of AH salt and 21.0 g of a 50% aqueous solution of ACL (corresponding to 0.15% by weight of ACL, based on the polyamide) were weighed into a 25 liter pressure autoclave. A nitrogen atmosphere was produced in the autoclave by forcing nitrogen in three times under a pressure of 3 bar and then releasing the pressure. The reaction mixture was rapidly heated to 200° C. (in about 1 hour) with stirring while the reactor was closed and the reaction mixture was then further heated to 200° C. for 1 hour under its own pressure with stirring. The pressure was then slowly released over a period of 3 hours (discharge of the water of reaction) and the reaction mixture was rapidly heated to 270° C, within about 1 hour, under nitrogen. The reaction was stopped as soon as the temperature reached 270° C. The mixture was immediately left to settle and the polyamide was forced as a strand under the excess nitrogen pressure through the bottom valve into a water bath. After granulation, the polyamide had a high melt viscosity and a relative viscosity of 3.2.

EXAMPLES 7 TO 10 AND Comparison Example 2

In Examples 7 to 10 and Comparison Experiment 2, polyamides and copolyamides were prepared from starting materials shown in Table 1 by methods analogous to that of Example 1.

TABLE

| Example | Starting Materials | ACL Concentration | Poly-Condensation time (270° C.) | $\eta_{rel}$ (1% m-cresol/ 25° C. |
|---|---|---|---|---|
| 7 | 80 parts AH salt 20 parts 6,9 salt[1] | 0.5% | 30 | 3.4 |
| 8 | 25 parts AH salt 75 parts 6,9 salt[1] | 0.5% | 30 | 3.1 |
| 9 | 100 parts 6,9 salt[1] | 0.5% | 30 | 3.3 |
| 10 | 100 parts 6,12 salt[2] | 0.6% | 60 | 3.6 |
| Comparison Experiment 2 | 100 parts 6,12 salt[2] | — | 60 | 2.2 |

[1] Salt of equimolar parts of hexamethylene-1,6-diamine and azelaic acid.
[2] Salt of equimolar parts of hexamethylene-1,6-diamine and dodecane diacid.

These examples confirm the influence of aminocaprolactam (ACL) in reducing the reaction time.

EXAMPLE 11

77 g of 11-aminoundecanoic acid, 0.42 g of ACL and 0.20 g of adipic acid were weighed in as in Example 1 but after the precondensation at 200° C. the reaction mixture was only heated to 220° C. and polycondensation was carried out for 1 hour at 220° C. A high molecular weight polyamide having a relative viscosity of 3.1 was obtained.

COMPARISON EXPERIMENT 3

When Example 11 was carried out with 11-aminoundecanoic acid alone, i.e. without the additives according to the invention, the polyamide obtained under the same conditions had a very low melt viscosity and a relative viscosity of only 2.4.

We claim:

1. A process for the preparation of aliphatic (co)polyamide by the polycondensation of polyamide-forming, predominantly aliphatic diamine and dicarboxylic acid or salts thereof or polyamide forming amino acid, with or without ω-lactams, characterised in that from 0.02 to 1% by weight of α-amino -ε-caprolactam (ACL) is added to the polyamide forming mixture which is polymerised.

2. A process according to claim 1, characterised in that a quantity of polycarboxylic acid approximately equivalent to the αamino group in the α-amino-ε-caprolactam is added.

3. A process according to claim 1, characterised in that α-amino-ε-caprolactam is added to the monomer mixture before or at the beginning of the polycondensation.

4. A process according to claim 1 wherein polycondensation is at a reduced melt polycondensation time amounting to less than half that conventionally required for ACL-free (co)polyamides at the given polycondensation temperature.

5. A process according to claim 1, characterised in that polycondensation times in the melt of from 0.1 to 3 hours are employed at polycondensation temperatures in the melt of >200° C.

6. A process according to claim 1 wherein the polycondensation is followed by an after-condensation in the solid phase whereby polyamide is formed with increased solution viscosity and melt viscosity which has a branched structure but is still soluble in cresol.

7. A process according to claim 6, characterised in that the solid phase after-condensation of the ACL-modified (co)polyamide is carried out continuously or discontinuously at a temperature from 140° to 240° C., but always at least 10 deg. cent. below the melting point of the given polyamide and in that the reaction time is chosen in the range of from a few minutes to about 30 hours, the longer reaction times being employed especially at the lower reaction temperatures.

8. A process according to claim 1 wherein the diamine is hexamethylene diamine, trimethylhexamethylene diamine or mixture thereof, the dicarboxylic acid is adipic acid, azelaic acid, sebacic acid, dodecane diacid, or mixture thereof and the amino acid is 11-aminoundecanoic acid or 6-aminohexanoic acid and the lactam is ε-caprolactam or lauryl lactam.

9. A process according to claim 1 wherein from 0.1 to 0.6% by weight of α-amino-ε-caprolactam is added to the polyamide forming mixture.

10. A process according to claim 5 wherein the polycondensation temperature is from 220° to 285° C.

11. A process according to claim 7 wherein the after-condensation is at 150° to 230° C. but always at least 20 deg. cent. below the melting point of the polyamide for a time of 0.5 to 20 hours.

* * * * *